United States Patent
Johnson et al.

(10) Patent No.: US 7,591,277 B2
(45) Date of Patent: Sep. 22, 2009

(54) FUEL BALANCING SYSTEM

(75) Inventors: Richard A. Johnson, Seattle, WA (US);
Michael J. Penty, Bellevue, WA (US);
Michael A. Striefel, Seattle, WA (US);
Thomas R. Duranti, Republic, WA
(US); Diane Duranti, legal
representative, Republic, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/965,792

(22) Filed: Dec. 28, 2007

(65) Prior Publication Data
US 2008/0099079 A1    May 1, 2008

Related U.S. Application Data

(63) Continuation of application No. 11/251,659, filed on Oct. 17, 2005, now Pat. No. 7,337,795.

(51) Int. Cl.
*F17D 3/01*    (2006.01)
*B64C 17/10*    (2006.01)

(52) U.S. Cl. ............ 137/1; 137/265; 137/386; 244/135 C

(58) Field of Classification Search ......... 137/265, 137/255, 386, 1; 244/135 C, 135 A
See application file for complete search history.

(56) References Cited

U.S. PATENT DOCUMENTS

| | | | |
|---|---|---|---|
| 2,823,880 A | 2/1958 | Bergeson | |
| 3,319,570 A * | 5/1967 | Norris et al. | 417/80 |
| 3,627,239 A | 12/1971 | Hull, Jr. | |
| 3,669,136 A | 6/1972 | Parenti et al. | |
| 4,591,115 A | 5/1986 | DeCarlo | |
| 4,609,169 A | 9/1986 | Schweickert et al. | |
| 4,932,609 A | 6/1990 | Secchiaroli et al. | |
| 5,321,945 A | 6/1994 | Bell | |
| 5,660,358 A | 8/1997 | Grafwallner et al. | |
| 5,704,387 A * | 1/1998 | Sims | 137/263 |
| 6,736,354 B2 | 5/2004 | Goto et al. | |
| 6,913,228 B2 * | 7/2005 | Lee et al. | 244/135 C |
| 7,337,795 B2 | 3/2008 | Johnson et al. | |
| 7,426,935 B2 * | 9/2008 | Schwan et al. | 137/266 |

* cited by examiner

*Primary Examiner*—Kevin L Lee
(74) *Attorney, Agent, or Firm*—Harness, Dickey & Pierce, P.L.C.

(57) ABSTRACT

A fuel system for a mobile platform is provided. The system includes a crossfeed fuel transmission assembly having a single crossfeed valve that controls fuel consumption from a first fuel tank and a second fuel tank. The system additionally includes a balancing fuel transfer assembly fluidly connected to the crossfeed fuel transmission assembly. The balancing fuel transfer assembly includes a plurality of fuel balancing valves for controlling a transfer of fuel to the first and second fuel tanks. The fuel system further includes a fuel balancing controller for automatically controlling the fuel balancing valves to automatically control the transfer of fuel to the first and second fuel tanks.

20 Claims, 6 Drawing Sheets

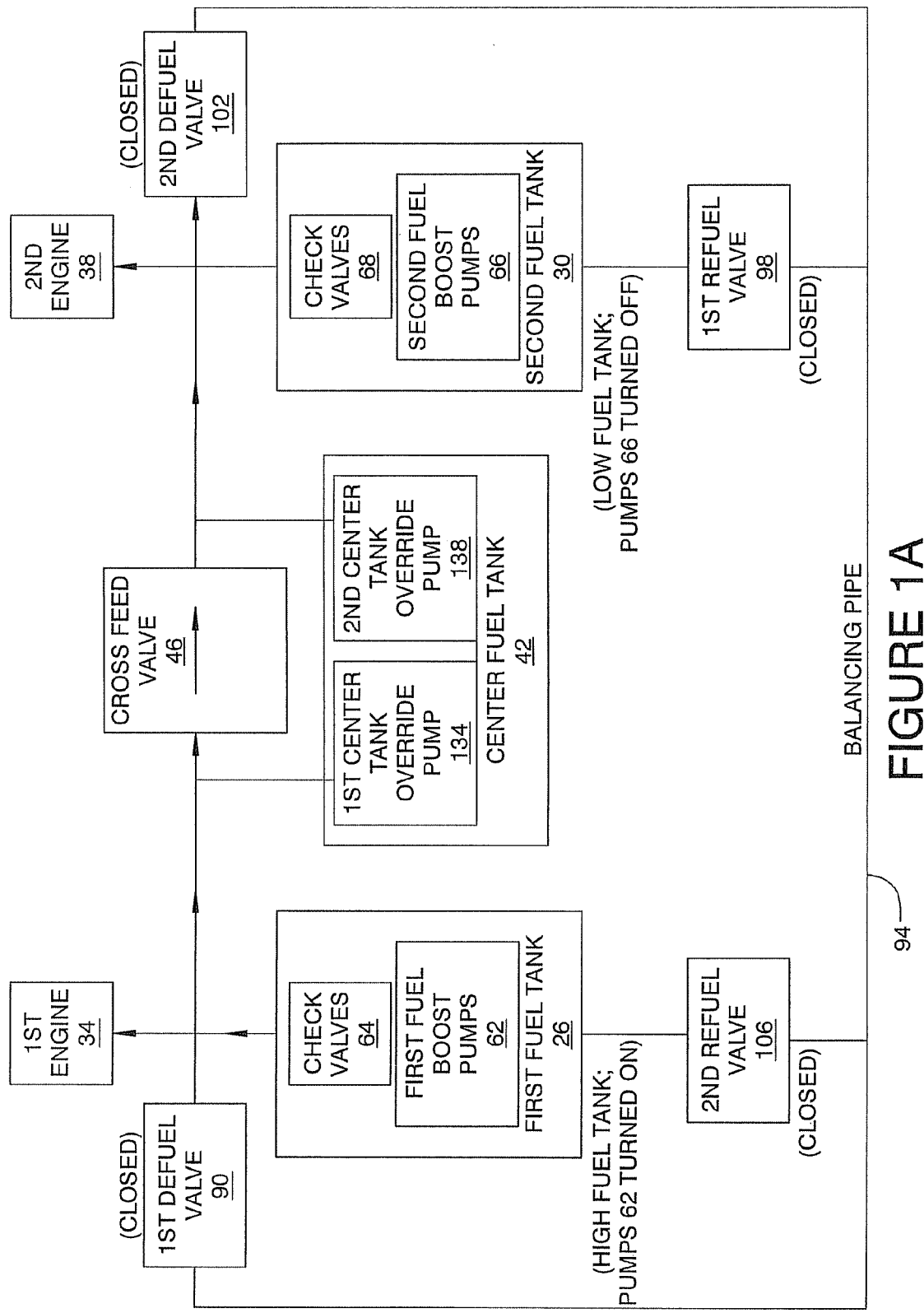

FUEL BALANCING SYSTEM

CROSS-REFERENCE TO RELATED APPLICATIONS

This application is a continuation of U.S. patent application Ser. No. 11/251,659, entitled Fuel Balancing System, filed on Oct. 17, 2005, now U.S. Pat. No. 7,337,795, which is incorporated herein as if set forth in full.

FIELD OF INVENTION

The invention relates generally to mobile platform fuel systems. More particularly, the invention relates to a fuel balancing system for mobile platforms having a plurality of fuel tanks.

BACKGROUND OF THE INVENTION

Mobile platforms having a plurality of fuel tanks often need to balance the fuel levels between the various fuel tanks to evenly distribute, or balance, the weight of the fuel in each fuel tank. For example, an aircraft with a fuel tank in each of the main wings will endeavor to maintain approximately equal fuel levels in each tank to improve ease of control, safety and fuel efficiency of the aircraft during flight. Although it will be understood that the term "mobile platform" as used herein refers to various applicable mobile platforms such as buses, trains, ships and aircraft, the exemplary references made throughout the present application will be made with reference to aircraft. However, it will further be understood that the reference to aircraft is merely exemplary and not to be construed as limiting the scope of the invention to aircraft only. Rather, the invention relates to any and all mobile platforms having a plurality of fuel tanks where balancing the fuel levels in the fuel tanks is desirable.

Additionally, the operation of many mobile platforms is governed by various state and federal regulations. For example, with reference to aircraft, in order to show compliance with regulations, it must be shown that if one engine needs to be shut down during flight, referred to as an in-flight shutdown (IFSD) event, enough fuel is available to the remaining engine to reach a diversion airport. Therefore, such mobile platforms typically implement fuel systems that have a dual crossfeed configuration that fluidly connects the two or more fuel tanks. Therefore, fuel can be consumed from any fuel tank through a crossfeeding fuel transmission structure, e.g., a crossfeeding piping system. More particularly, the dual crossfeed configuration includes two different fuel crossfeed paths such that the failure of either crossfeed path in conjunction with an IFSD event does not jeopardize the safe operation of the aircraft.

Known crossfeed configurations often employ redundant fuel piping and valve equipment that performs no other purpose than redundancy. Having such additional redundant equipment is an inefficient use of resources on the mobile platform. Other known crossfeed configurations on aircraft incorporate a single crossfeed system and a separate gravity-flow redundant, i.e., backup, transfer system that requires the flight crew to activate the system and sideslip the aircraft to induce flow in the correct direction. This requires elaborate procedures that increase pilot workload. Still other known systems use dedicated transfer pumps and piping to transfer fuel from one tank to another, i.e., transfer fuel from the 'high level' tank to the 'low level' tank. Additionally, some such systems are know to be fully automated whereby the fuel transfer takes place without initiation, monitoring or any other involvement or action by the mobile platform operator, e.g., a pilot of an aircraft. These known systems comprise additional equipment, which is an inefficient use of mobile platform resources.

Therefore, it would be desirable to implement a mobile platform fuel system that meet applicable regulations with reduced weight, reduced manufacturing and maintenance costs, that does not increase crew workload and provides an acceptable interface to the crew.

BRIEF SUMMARY OF THE INVENTION

The present invention provides a novel fuel balancing system and method for balancing the amount of fuel, i.e., fuel levels, between at least two fuel tanks of a mobile platform. As used herein, a mobile platform will be understood to be any self-propelled vehicle for carrying one or more passengers, e.g., an aircraft, a bus, a train, a spacecraft or a ship. Additionally, it should be understood that, although the present invention will be described and illustrated herein with reference to aircraft, such reference is merely exemplary and is not to be considered limiting.

In various embodiments, a mobile platform fuel balancing system is provided. The system includes a crossfeed fuel transmission assembly (CFTA) comprising a single crossfeed valve for controlling fuel flow through a crossfeed pipe. The crossfeed pipe is fluidly connected at a first distal end portion to a first fuel tank of the mobile platform and fluidly connected at an opposing second distal end portion to a second fuel tank of the mobile platform. At least one first fuel boost pump is fluidly connected to the crossfeed pipe at the first distal end portion for pumping fuel from the first fuel tank. Additionally, at least one second fuel boost pump fluidly connected to the crossfeed pipe at the second distal end portion for pumping fuel from the second fuel tank.

The system additionally includes a balancing fuel transfer assembly (BFTA) comprising the first and second boost pumps and the first and second distal end portions of the crossfeed pipe. The BFTA further includes a first defuel valve that controls a fuel flow out of the first fuel tank to the second fuel tank through a balancing pipe. The balancing pipe fluidly connects the first and second fuel tanks. The BFTA additionally includes at least one first refuel valve that controls the fuel flow into the second fuel tank from the first fuel tank through the balancing pipe. Further yet, the BFTA includes a second defuel valve that controls a fuel flow out of the second fuel tank to the first fuel tank through the balancing pipe, and at least one second refuel valve that controls the fuel flow into the first fuel tank from the second fuel tank. The system may include a center fuel tank having at least one override pump The system further includes a fuel balancing controller that automatically controls a transfer of fuel to the first and second fuel tanks, via the BFTA. The fuel balancing controller automatically controls the first and second defuel valves and the first and second refuel valves to thereby control the direction of fuel flow to the first and second fuel tanks, via the BFTA. Thus, the balancing controller automatically determines whichever of the first and second fuel tanks has higher and/or lower level of fuel, e.g., contains a greater and/or lesser quantity of fuel. Then upon initiation by a mobile platform operator, e.g., a pilot, the balancing controller controls a transfer of fuel from the higher level fuel tank, or the center fuel tank, to the respective first or second fuel tank having the lower level of fuel. Furthermore, the balancing controller automatically determines when sufficient fuel has been transferred from the high level fuel tank, or the center fuel tank, to the low level fuel tank such that the fuel levels in the first and second fuel tanks are approximately equal. The balancing controller then automatically terminates the fuel transfer. The balancing controller will also automatically terminate a transfer of fuel between the fuel tanks if an error occurs, or a fault is detected, in the BFTA.

The features, functions, and advantages of the present invention can be achieved independently in various embodiments of the present inventions or may be combined in yet other embodiments.

BRIEF DESCRIPTION OF THE DRAWINGS

The present invention will become more fully understood from the detailed description and accompanying drawings, wherein:

FIG. 1A is a schematic drawing of one embodiment of the system wherein the crossfeed valve is being controlled to pump fuel from the first tank to the second fuel tank, and to both engines while both engines are running;

Corresponding reference numerals indicate corresponding parts throughout the several views of drawings.

DETAILED DESCRIPTION OF THE INVENTION

The following description of the preferred embodiments is merely exemplary in nature and is in no way intended to limit the invention, its application or uses. Additionally, the advantages provided by the preferred embodiments, as described below, are exemplary in nature and not all preferred embodiments provide the same advantages or the same degree of advantages.

Figure 1:
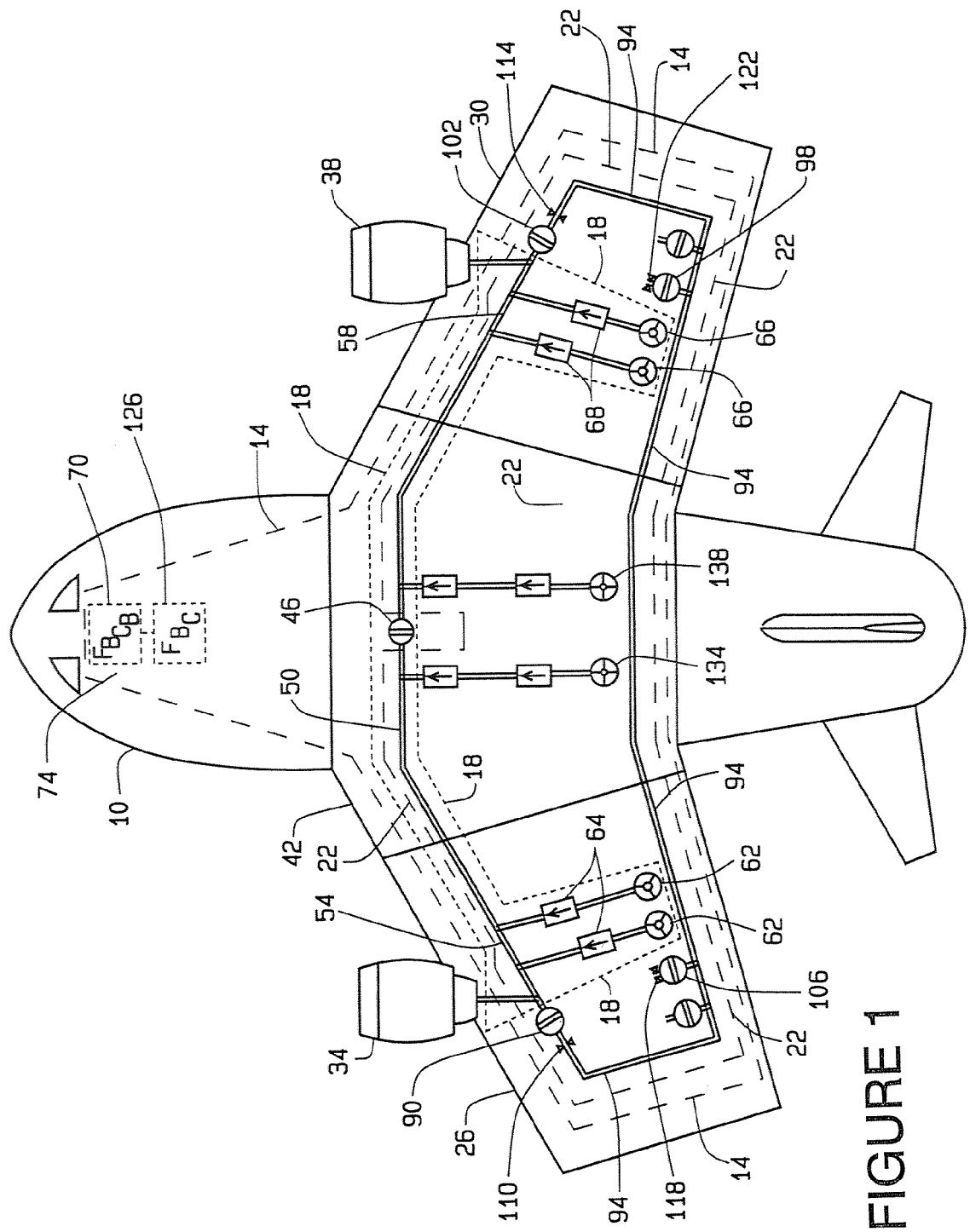
FIG. 1 is a schematic of a mobile platform, exemplary illustrated as an aircraft, including a fuel balancing system in accordance with various embodiments of the present invention.

FIG. 1 is a schematic of a mobile platform 10, exemplary illustrated as an aircraft, including a fuel balancing system 14, in accordance with various embodiments of the present invention. The fuel balancing system 14 generally includes a crossfeed fuel transmission assembly (CFTA) 18 and a balancing fuel transfer assembly (BFTA) 22. The CFTA 18 operates to effectively balance fuel levels, e.g., quantities of fuel, between a first fuel tank 26 and a second fuel tank 30 by providing fuel to operate at least one first engine 34 and at least one second engine 38. During normal, non-fuel-balancing operation, the first engine 34 is provided fuel for operation from the first fuel tank 26 and the second engine 38 is provided fuel for operation from the second fuel tank 30. The exemplary aircraft/mobile platform 10 of FIG. 1 additionally illustrates a center fuel tank 42 that can be used to provide fuel for the operation of either or both the first and second engines 34 and 38. Generally, in the exemplary aircraft/mobile platform 10 of FIG. 1, fuel is consumed by the first and second engines 34 and 38 from the center fuel tank 42 first and then consumed from the respective first and second fuel tanks 26 and 30.

The CFTA 18 additionally includes a single crossfeed valve 46 that controls fuel flow through a crossfeed pipe 50. The crossfeed pipe 50 is fluidly connected at a first distal end portion 54 to the first fuel tank 26, via at least one first fuel boost pump 62, and fluidly connected at an opposing second distal end portion to the second fuel tank 30, via at least one second fuel boost pump 66. The first fuel boost pump 62 is fluidly connected to the first distal end portion 54 of the crossfeed pipe 50 for pumping fuel from the first fuel tank 26. At least one first check valve 64 is included in the CFTA 18 to ensure that fuel does not flow back toward or into an output port (not shown) of the first fuel boost pump 62. The second fuel boost pump 66 is fluidly connected to the second distal end portion 58 of the crossfeed pipe 50 for pumping fuel from the second fuel tank 30. Additionally, at least one second check valve 68 is included in the CFTA 18 to ensure that fuel does not flow back toward or into an output port (not shown) of the second fuel boost pump 66.

During operation of the mobile platform 10, for various reasons, the fuel levels between the first and second fuel tanks 26 and 30 can become undesirably imbalanced or uneven. That is, the fuel level in the first fuel tank 26 may decrease at a greater rate than the fuel level in the second fuel tank 30 to a point where the imbalance is undesirable. Or, the fuel level in the second fuel tank 30 may decrease at a greater rate than the fuel level in the second fuel tank 26 to a point where the imbalance is undesirable. Thus, either the first or second fuel tank 26 or 30 will undesirably have a higher fuel level, i.e., a greater quantity of fuel, than the respective other first or second fuel tank 26 or 30 having a lower fuel level, i.e., lesser quantity of fuel. The fuel tank having the higher fuel level, e.g., the first or the second fuel tank 26 or 30, will be referred to herein as the 'high level fuel tank'. Conversely, the fuel tank having the lower fuel level, e.g., the first or the second fuel tank 26 or 30, will be referred to herein as the 'low level fuel tank'. In various embodiments, if such a fuel imbalance between the first and second fuel tanks should occur, a mobile platform operator, e.g., a pilot, can initiate a fuel crossfeed process, via a fuel balance control panel (FBCP) 70 located in a mobile platform operator cabin area 74, e.g., a cockpit.

Figure 2:
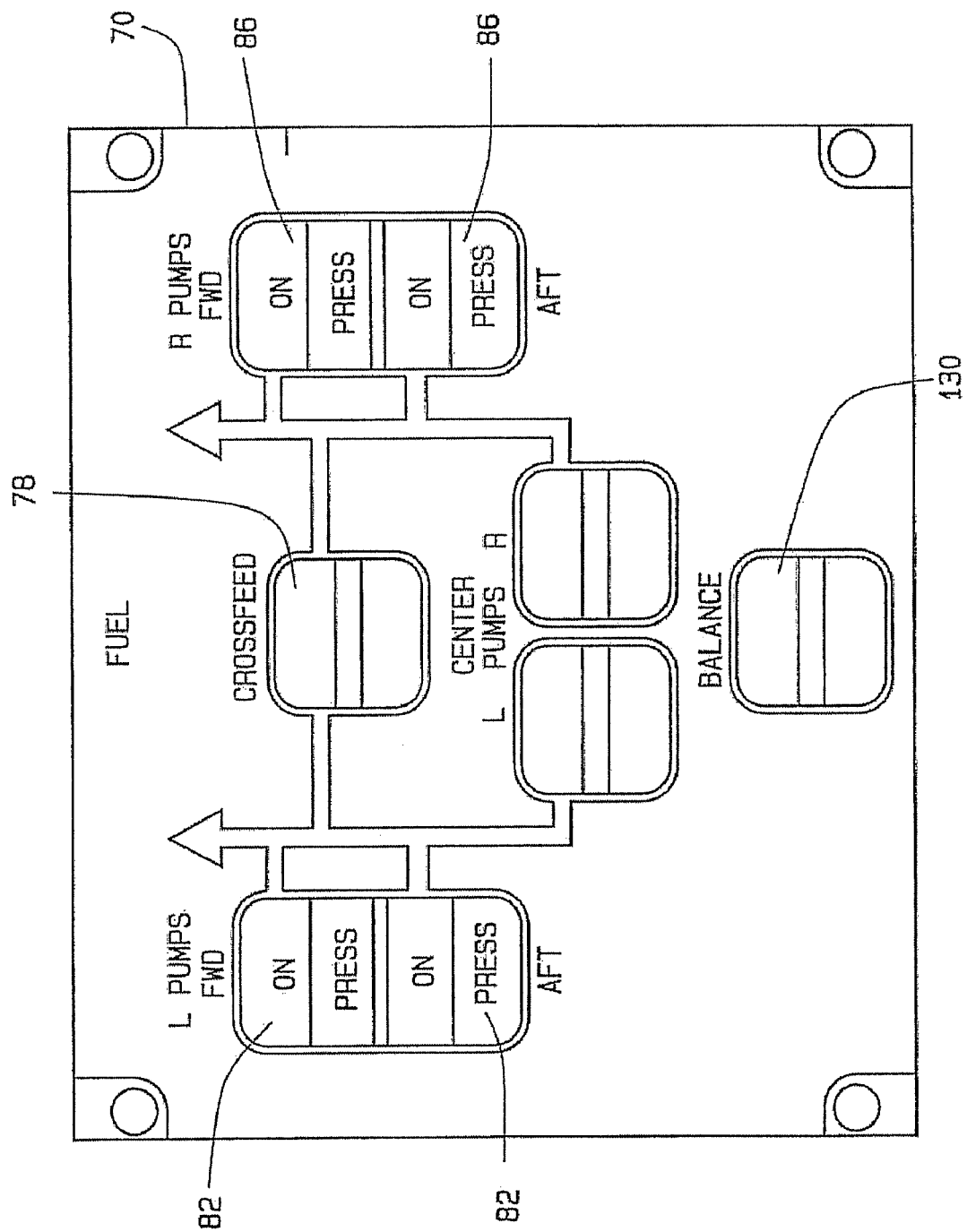
FIG. 2 is a schematic of an exemplary mobile platform fuel balance control panel included in the fuel balancing system shown in FIG. 1.

Referring now to FIGS. 1 and 2, the fuel balance control panel 70 includes a crossfeed switch 78 for controlling the crossfeed valve 46, at least one first boost pump switch 82 for controlling the at least one first boost pump 62 and at least one second boost pump switch 86 for controlling the at least one second boost pump 66. During normal operation of the mobile platform 10, the first and second boost pumps 62 and 66 are operating to provide fuel to the first and second engines 34 and 38. Specifically, the first boost pump 62 pumps fuel to the first engine 34 and the second boost pump 66 pumps fuel to the second engine 38. Thus, the first engine 34 is consuming fuel from the first fuel tank 26 to operate and the second engine 38 is consuming fuel from the second fuel tank 30 to operate.

To effectively balance the fuel levels between the first and second fuel tanks 26 and 30 during operation of the mobile platform 10, using the CFTA 18, the mobile platform operator positions the crossfeed switch 78 to open the crossfeed valve 46. Opening the crossfeed valve 46 allows fuel to flow through the crossfeed pipe 50. The mobile platform operator then uses the appropriate first or second boost pump switch 82 or 86 to turn off the respective first or second boost pump 62 or 66 in the low level fuel tank 26 or 30. This terminates the pumping of, i.e., the consumption of, fuel from the low level fuel tank. The respective other first or second boot pump 62 or 66 continues to pump fuel from the high level fuel tank. With the crossfeed valve 46 in the open position, the operating boost pump 62 or 66 in the high level tank 26 or 30 pumps fuel to the related high level fuel tank engine 34 or 38 and additionally pumps fuel through the crossfeed pipe 50 to the low level fuel tank engine 34 or 38. Thus, both the first and second engines operate consuming fuel from the high level fuel tank 26 or 30. The mobile platform operator monitors the fuel levels in the first and second fuel tanks 26 and 30 using other instrumentation (not shown) in the mobile platform operation cabin area 74 until the fuel levels are approximately equal. Once the fuel levels are approximately equal, i.e., approximately level, the mobile platform operator uses the crossfeed switch 78 and the appropriate boost pump switch 82 or 86 to turn the low level fuel tank boost pumps 62 or 66 back on, and close the crossfeed valve 46.

Referring again to FIG. 1, alternatively, the fuel levels between the first and second fuel tanks 26 and 30 can be balanced during operation of the mobile platform, i.e., while the first and second engines are operating, using the BFTA 22. The BFTA 22 includes the first and second boost pumps 62 and 66 and the first and second distal end portions 54 and 58 of the crossfeed pipe 50. Additionally, the BFTA 22 includes a first defuel valve 90 that controls fuel flow out of the first fuel tank 26 to the second fuel tank 30 through a balancing pipe 94 fluidly connecting the first and second fuel tanks 26 and 30. The BFTA 22 also includes at least one first refuel valve 98 that controls fuel flow into the second fuel tank 30 from the first fuel tank 26 through the balancing pipe 94. Furthermore, the BFTA 22 includes a second defuel valve 102 that controls fuel flow out of the second fuel tank 30 to the first fuel tank 26 through the balancing pipe 94. The BFTA 22 further includes at least one second refuel valve 106 that controls fuel flow into the first fuel tank 26 from the second fuel tank 30 through the balancing pipe 94. The first defuel valve 90, first refuel valve 98, second defuel valve 102 and the second refuel valve 106 will be cumulatively referred to herein as the fuel balancing valves.

The fuel balancing pipe 94 includes a first fuel pressure orifice 110 for maintaining proper fuel pressure to the first engine 34 being supplied fuel from the first fuel tank 26. The fuel balancing pipe 94 additionally includes a second fuel pressure orifice 114 for maintaining proper fuel pressure to the second engine 38 being supplied fuel from the second fuel tank 30. More particularly, the first and second fuel pressure orifices 110 and 114 are adapted to ensure that a higher fuel pressure within the balancing pipe 94 is maintained on the respective engine side of the first and second fuel pressure orifices 110 and 114 during a fuel balancing operation utilizing the BFTA 22, as described below. The first and second fuel pressure orifices 110 and 114 can be any suitable device or means for producing a higher fuel pressure within the balancing pipe 94 on the engine sides of the orifices 110 and 114. For example, the first and second fuel pressure orifices 110 and 114 can be a baffle, a gate, a valve, or calibrated narrowing of the balancing pipe 94. In various embodiments, the BFTA 22 also includes a first refuel pressure orifice 118 in fluid communication with the second refuel valve 106 and a second refuel pressure orifice 122 in fluid communication with the first refuel valve 98. The first and second refuel pressure orifices 118 and 122 are adapted to restrict the fuel flow rate into the respective first and second fuel tanks 26 and 30. The slower fuel flow rate slows the dynamics of the fuel transfer to support sensing required for the automated features of the BFTA 22, as described herein. The first and second refuel pressure orifices 118 and 122 can be any suitable device or means for controlling the fuel flow rate into the respective first and second fuel tanks 26 and 30. For example, the first and second refuel pressure orifices 118 and 122 can be a baffle, a gate or an operation of the respective refuel valves 98 and 106.

Referring now again to FIGS. 1 and 2, the fuel balancing system 14 additionally includes a fuel balancing controller (FBC) 126 that electronically communicates with a fuel balance switch 130 of the FBCP 70. The FBC 126 is a computer-based controller adapted to automatically control a transfer of fuel to the first and second fuel tanks 26 and 30, via the BFTA 22. More particularly, upon activation by fuel balancing switch 130, the FBC 126 automatically controls the operation of the first and second defuel valves 90 and 102, and the operation of the first and second refuel valves 98 and 106, to thereby control the transfer of fuel to the first and second fuel tanks 26 and 30. The fuel balance switch 130 is any suitable switch that can be manually controlled or operated by the mobile platform operator, e.g., a pilot, to initiate a transfer of fuel from the high level fuel tank 26 or 30, or the center fuel tank 42, to the low level fuel tank 26 or 30 via the BFTA 22. For example, in various embodiments the fuel balance switch 130 is a momentary action switch.

Although, in various embodiments, the FBC 126 is adapted to automatically terminate the transfer of fuel through the balancing pipe 94, the transfer of fuel can also be manually terminated by the mobile platform operation, via the fuel balance switch 130. The FBC 126 can be part of a stand alone computer based system for controlling the fuel balancing system 14, or the FBC 126 can be part of any other computer based system of the mobile platform 10. For example, the FBC 126 can be part of a main, or core, computing system of the mobile platform 10. That is, computer logic or code for automatically controlling the BFTA 22 contained in fuel system software is loaded on the core computer system. Furthermore, in various embodiments, the fuel balance switch 130 is a single position switch that is manually manipulated, e.g., pressed, by the mobile platform operator to initiate a fuel transfer from the high level fuel tank 26 or 30, or the center fuel tank 42, to the low level fuel tank 26 or 30, via the BFTA 22.

As set forth above, in various embodiments, during operation of the mobile platform 10, the first and second boost pumps 62 and 66 are operating to provide fuel to the first and second engines 34 and 38. Specifically, the first boost pump 62 pumps fuel to the first engine 34 and the second boost pump 66 pumps fuel to the second engine 38. Thus, the first engine 34 is consuming fuel from the first fuel tank 26 to operate and the second engine 38 is consuming fuel from the second fuel tank 30 to operate. Additionally, during normal operation of the mobile platform 10, each of the defuel and refuel valves 90, 98, 102 and 106 are in a closed position such that fuel does not flow through them. To effectively balance the fuel levels between the first and second fuel tanks 26 and 30, during operation of the mobile platform 10, using the BFTA 22, the mobile platform operator actuates the fuel balancing switch 130. An actuation command signal is transmitted from the fuel balancing switch 130 to the FBC 126. The FBC 126 interprets the actuation command signal and automatically determines which of the first and second fuel tanks 26 and 30 is the high level fuel tank and which is the low level tank. The FBC 126 then automatically operates first and second defuel valves 90 and 102, and the first and second refuel valves 98 and 106 so that the fuel will flow in the proper direction, i.e., from the high level fuel tank to the low level fuel tank.

Figure 1B:
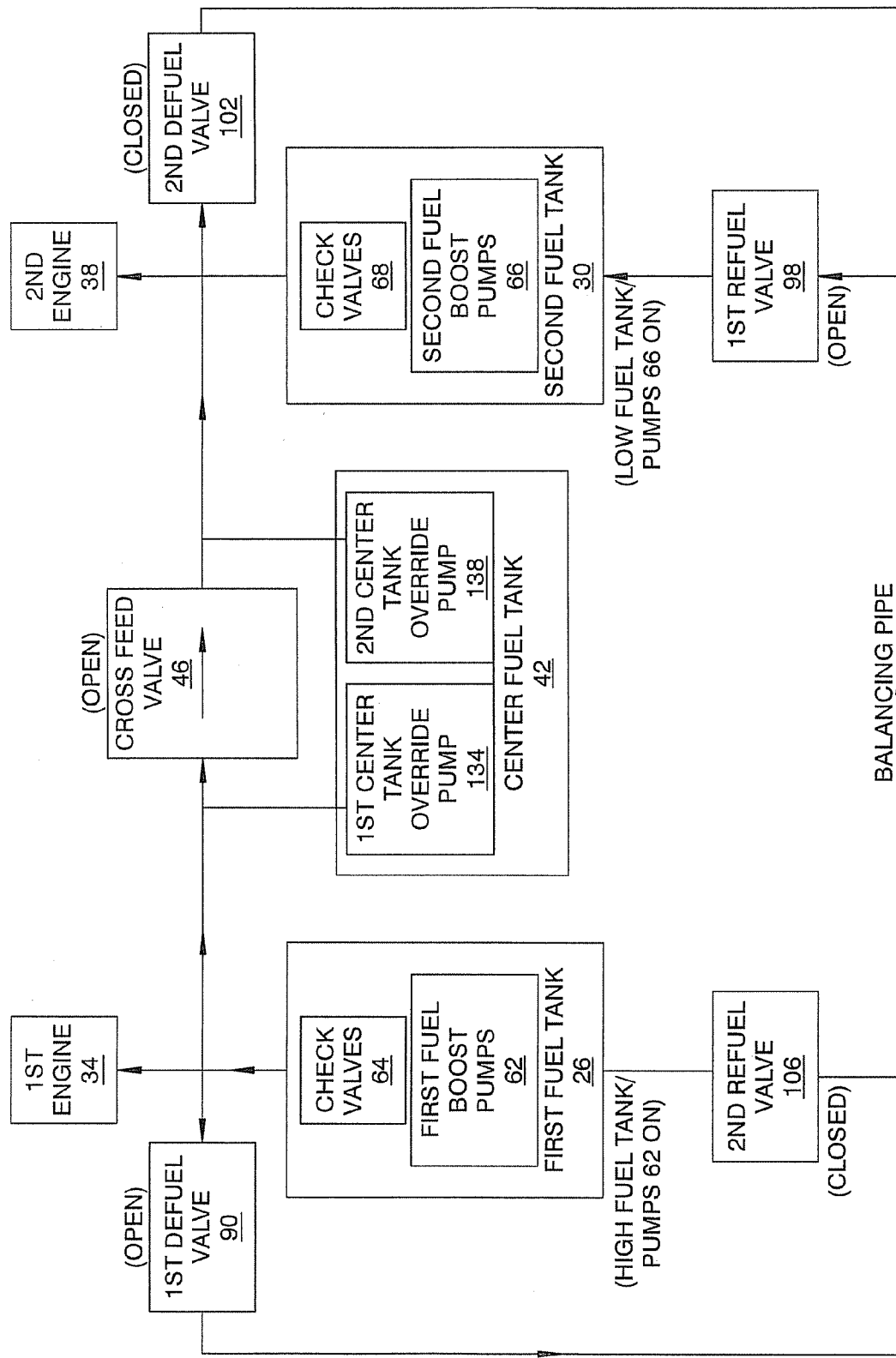
FIG. 1B is a schematic view of the system of FIG. 1 being used to supply fuel from the first fuel tank to both engines, and also to supply fuel through the balancing tube from the first (high) fuel tank to the second (low) fuel tank.

Moreover, the first and second boost pumps 62 and 66 remain in operation, i.e., running, so that fuel is simultaneously pumped from the high level tank 26 or 30 to the low level tank 26 or 30, and to each of the first and second engines 34 and 38. For example, if the first fuel tank 26 is the high level tank, the FBC 126 will automatically open the first defuel valve 90 and the first refuel valve 98 (FIG. 1B). The first fuel boost pump 62 will then continue to pump fuel to the first engine 34 while simultaneously pumping fuel to the low level second fuel tank 30. Furthermore, since the second defuel valve 102 remains in the closed position, the second fuel boost pump 66 will continue to pump fuel to the second engine 38 only. The FBC 126 will monitor the transfer of fuel from the high level tank 26 to the low level tank 30 and when the fuel levels are approximately equal, the FBC 126 will automatically terminate the transfer of fuel by automatically closing the first defuel and refuel valves 90 and 98. Conversely, if the second fuel tank 30 is the high level tank, the FBC 126 will automatically open the second defuel valve 102 and the second refuel valve 106. The second fuel boost pump 66 will then continue to pump fuel to the second engine 38 while simultaneously pumping fuel to the low level first fuel tank 26. Furthermore, since the first defuel valve 90 remains in the closed position, the first fuel boost pump 62 will continue to pump fuel to the first engine 34 only. The FBC 126 will again monitor the transfer of fuel from the high level tank 30 to the low level tank 26 and when the fuel levels are approximately equal, the FBC 126 will automatically terminate the transfer of fuel by automatically closing the second defuel valve 102 and the second refuel valve 106.

Alternatively, if desirable, the mobile platform operator can manually terminate the transfer of fuel in either direction by pressing the fuel balance switch 130. Pressing the fuel balance switch 130 during a fuel transfer, via the BFTA 22, will send a command signal to the FBC 126. In response thereto, the FBC 126 will automatically close the open defuel and refuel valves 90 and 98, or 102 and 106. An advantage of balancing the fuel levels between the first and second fuel tanks 26 and 30 using the BFTA 22 is that the fuel is pumped from the high level tanks 26 or 30 to the low level tank 26 or 30. Therefore, fuel balancing occurs significantly faster than when using the CFTA 18.

The fuel balancing system 14 is initiated by the mobile platform operator such that the mobile platform operator is aware of a fuel imbalance and that the fuel balancing system 14 is being activated to correct the imbalance. Additionally, once initiated by the mobile platform operator, via the fuel balance switch 130, the BFTA 22 is fully automated to lessen the work required by the mobile platform operator to monitor the fuel balancing process, and therefore lessen the potential for mobile platform operator error. Also, the first and second boost pumps 62 and 66 remain on during a fuel transfer via the BFTA 22, therefore, the first and second boost pumps 62 and 66 do not have to be cycled on and off, thereby saving and/or extending the life of boost pumps 62 and 66. Furthermore, balancing the fuel between the first and second fuel tanks 26 and 30 is considerably faster using the BFTA 22 because the BFTA 22 is automated and requires less monitoring and interaction by the mobile platform operator. Still further yet, the BFTA 22 is adapted to automatically terminate the transfer of fuel when the fuel levels are approximately equal, or if the controller detects a problem, error or fault within the fuel transfer process or with the BFTA 22. However, as described above, transferring of fuel using the BFTA 22 can also be manually terminated by the mobile platform operation pressing the fuel balance switch 130. Additionally, in various embodiments, the FBC 126 is adapted to automatically terminate the transfer of fuel between the first and second fuel tanks 26 and 30, via the BFTA 22, when the FBC 126 detects that fuel is being jettisoned or lost due to a leak in either the first or second fuel tanks 26 or 30.

A further advantage of the fuel balancing system 14 is that the BFTA 22 can also be utilized to balance the fuel levels between the first and second fuel tanks 26 and 30 when the mobile platform is not in transit, whereby the first and second engines are not consuming fuel. All that is necessary is that the first and second fuel boost pumps 62 and 66 be operating. A fuel transfer can then be initiated as described above using the fuel balance switch 130.

Figure 1C:
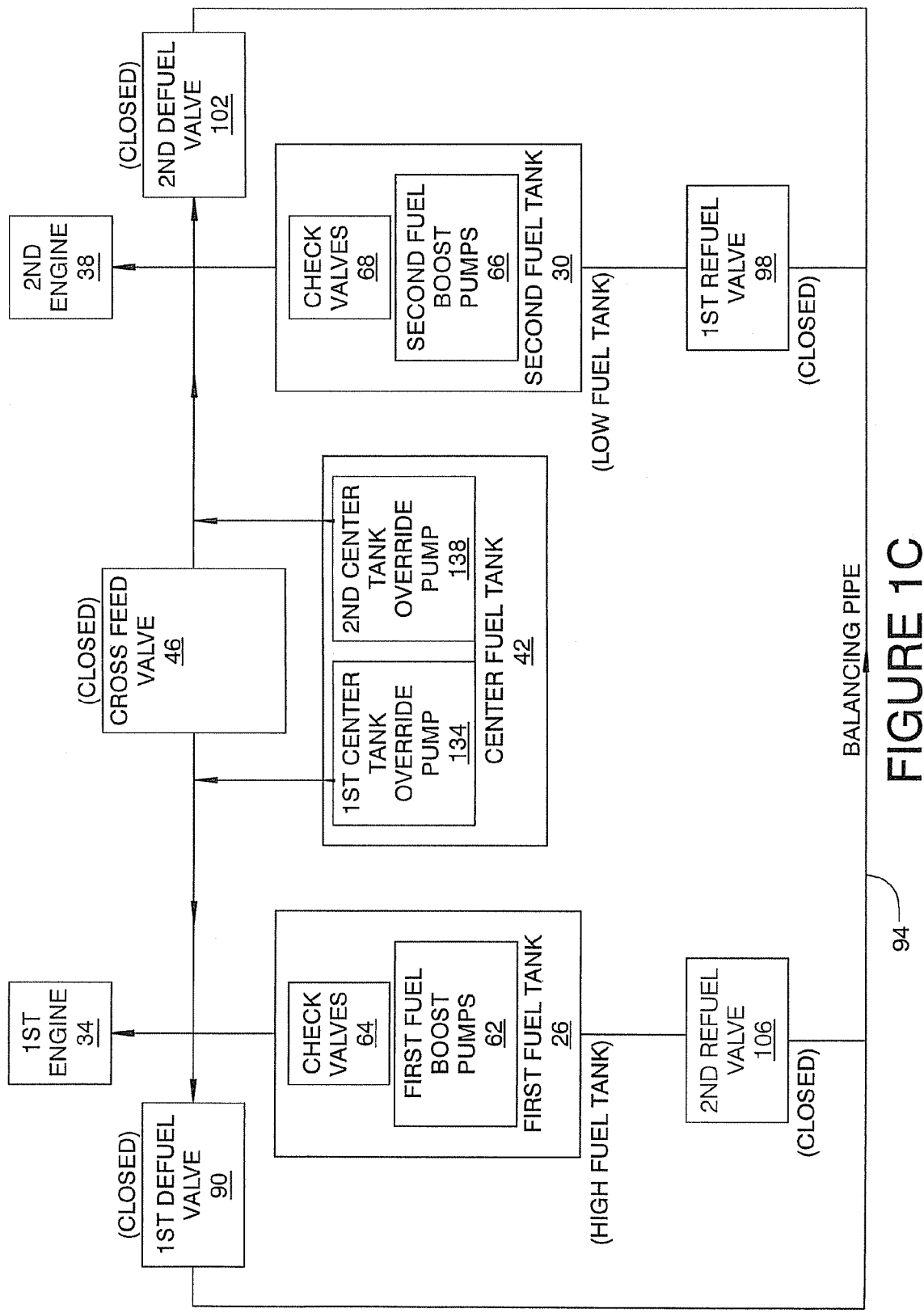
FIG. 1C is a schematic view of the system of FIG. 1 being used to supply fuel from the center tank to both engines.

In various exemplary embodiment wherein the mobile platform 10 includes the center fuel tank 42, as exemplarily illustrate in FIG. 1, another advantage of the fuel balancing system 14 is that the BFTA 22 can also be utilized to transfer fuel from the center fuel tank 42 to either of first or second fuel tanks 26 or 30. In such embodiments the BFTA 22 includes a first center tank override pump 134 and a second center tank override pump 138 and a portion of the crossfeed pipe 50, is indicated in FIG. 1. During operation of the mobile platform 10 wherein fuel is being burned from the center tank 42, the first center tank override pump 134 pumps fuel from the center tank 42 to the first engine 34 and the second center tank override pump 138 pumps fuel from the center tank 42 to the second engine 38 (FIG. 1C). The first and second override pumps 134 and 138 output fuel at a higher pressure than the first and second boost pumps 62 and 66. Thus, when the first and second override pumps 134 and 138 are operating the fuel output pressure will cause the first and second check valves to close, preventing the fuel from being pumped from the respective first and second fuel tanks 26 and 30.

Figure 1D:
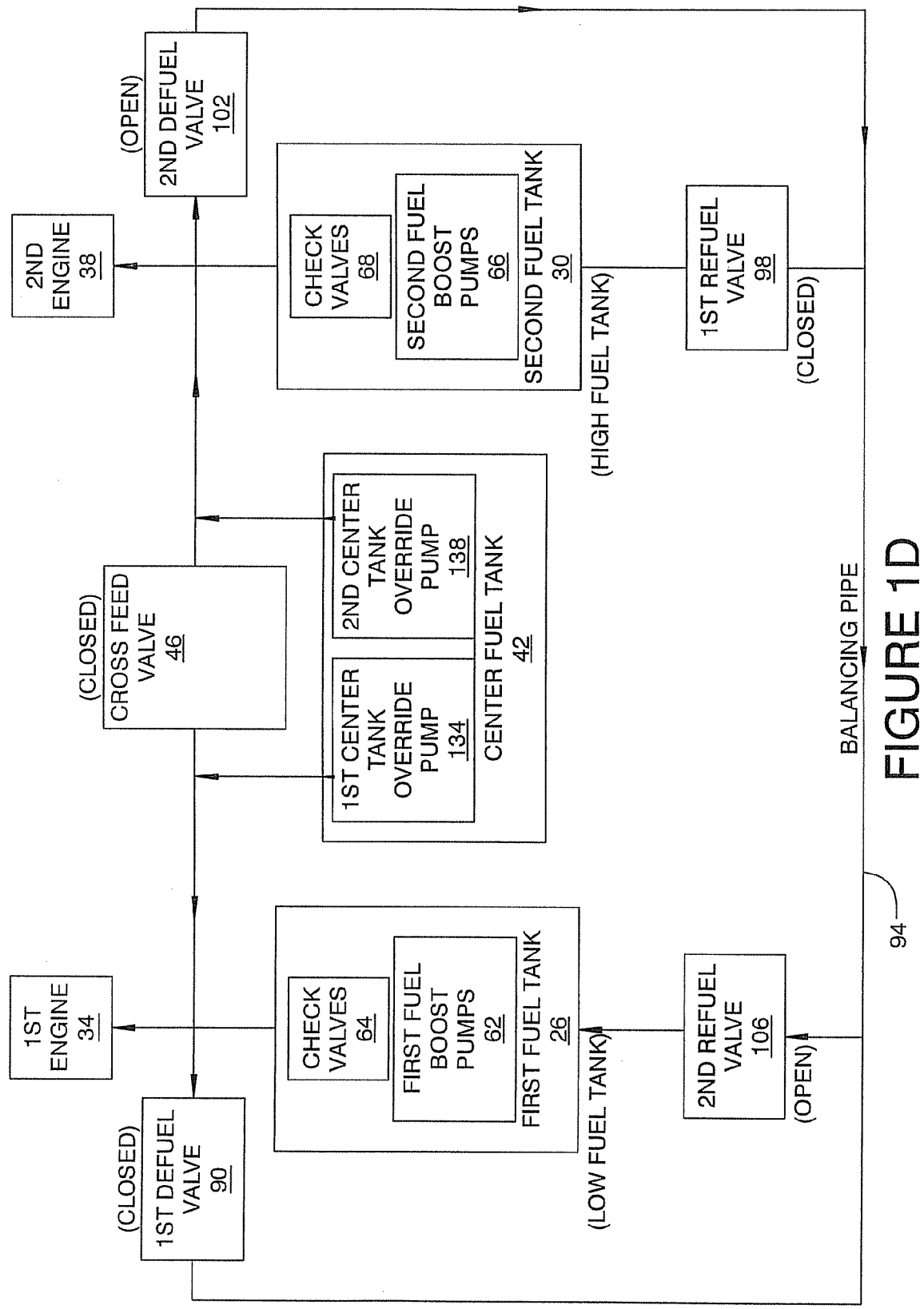
FIG. 1D is a schematic view of the system being used to supply fuel from the center fuel tank to both engines and also through the balancing tube from the second (high) fuel tank to the first (low) fuel tank.

When the first and second override pumps 134 and 138 are operating and the first or second fuel tank 26 or 30 is sensed to have less fuel than the respective other first or second fuel tank 26 or 30, the FBC 126 can command fuel to be transferred from the center tank 42 to the low level tank 26 or 30. For example, if the second override pump 136 is operating and the first fuel tank 26 is sensed to have less fuel than the second fuel tank 30, the FBG 126 can command fuel to be transferred from the center fuel tank 42 to the first fuel tank 26. More specifically, the FBC 126 can command the second defuel valve 102 to open and the second refuel valve 106 to open such that fuel is transferred from the center fuel tank 42 to the first fuel tank 26 until the fuel level of the first fuel tank is approximately equal to the fuel level of the second fuel tank 30 (FIG. 1D). Similarly, if the first override pump 134 is operating and the second fuel tank 30 is sensed to have less fuel than the first fuel tank 26, the FBC 126 can command the first defuel valve 90 to open and the first refuel valve 98 to open such that fuel is transferred from the center fuel tank 42 to the second fuel tank 30.

The fuel balancing system 14 adjusts the fuel level in the first fuel tank 26 or the second fuel tank 30 so that the level of fuel in the first and second fuel tanks 26 and 30 are approximately equal. Particularly, the fuel balancing system 14 either reduces the fuel level in whichever of the first or second tank 26 and 30 a higher level of fuel, or increases the fuel level in whichever of the first and second fuel tank 26 or 30 has the lower level of fuel, until the fuel levels in both the first and second fuel tanks 26 and 30 is approximately equal. In various embodiments, the fuel balancing is accomplished using the CFTA 18 as a primary balancing system and the BFTA 22 as a redundant backup balancing system if a failure occurs in the CFTA 18. Or, in various other embodiments the fuel balancing is accomplished using the BFTA 22 as the primary balancing system and the CFTA 18 as a redundant backup balancing system if a failure occurs in the BFTA 22.

Particularly, to balance the fuel levels between the first and second fuel tanks 26 and 30, the CFTA 18 pumps fuel from whichever of the first and second fuel tanks 26 or 30 contains the higher level of fuel through the crossfeed pipe 50 to both the first and a second engines 34 and 38. Thus, the CFTA 18 provides fuel for substantially simultaneously operating both the first and the second engines 34 and 38 until the level of fuel contained in the first and second fuel tanks 26 and 30 is approximately equal. The BFTA 22 transfers fuel from the center tank 42, or whichever of the first and second fuel tanks 26 or 30 contains the higher level of fuel, through the fuel balancing pipe 94 to the fuel tank 26 or 30 containing the lower level of fuel. The BFTA 22 pumps fuel from the center tank 42, or the high level tank 26 or 30, to the low level tank 26 or 30 until the level of fuel contained in the first and second fuel tanks 26 and 30 is approximately equal.

Furthermore, the fuel balancing system 14 includes components that can be used for other fuel management functions of the mobile platform 10, e.g., refueling and fuel jettison functions. Therefore, the fuel balancing system 14, particularly the BFTA 22, is incorporated into the mobile platform 10 in a very efficient manner that has minimal weight and cost impacts.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A fuel control system for a mobile platform, comprising:
   a balancing fuel transfer circuit adapted to selectively transfer fuel between first and second fuel reservoirs,
   a crossfeed fuel balancing circuit for supplying fuel from a third fuel reservoir to two independent engines of the mobile platform, and for selectively transferring fuel from said third fuel reservoir to said first and second fuel reservoirs without interrupting fuel flows to said engines.

2. The fuel control system of claim 1, further including a controller for controlling said balancing fuel transfer circuit.

3. The fuel control system of claim 1, wherein said balancing fuel transfer circuit is further adapted to supply fuel to said engines from said first and second fuel reservoirs while simultaneously transferring fuel between said first and second reservoirs.

4. The fuel control system of claim 1, further including a control panel for selectively controlling the operation of said crossfeed fuel balancing circuit and said balancing fuel transfer circuit.

5. The fuel control system of claim 4, wherein said control panel further comprises:
   a first switch for enabling an operator to control a first fuel boost pump for pumping fuel from said first fuel reservoir to a first one of the engines; and
   a second switch for enabling an operator to control fuel flow from said second fuel reservoir to a second of the engines.

6. The fuel control system of claim 5, wherein said crossfeed fuel balancing circuit includes a cross feed flow control valve disposed within a fuel flow conduit in flow communication with said engines, for controlling a fuel flow between said first and second engines, and wherein said crossfeed flow control valve is controlled via a user activated control on said control panel.

7. A method for controlling a fuel system on a mobile platform having first, second and third independent fuel reservoirs, and a pair of engines, comprising:
   using a first fuel balancing circuit to selectively supply fuel directly to said engines from said first and second fuel reservoirs, and to selectively transfer fuel between said first and second fuel reservoirs to balance quantities of fuel in said first and second fuel reservoirs; and
   using a second fuel balancing circuit to supply fuel from said third fuel reservoir to said pair of engines, and to selectively transfer fuel from said third fuel reservoir to either of first and second fuel reservoirs to balance fuel levels in said first and second fuel reservoirs.

8. The method of claim 7, wherein using said second fuel balancing circuit further comprises simultaneously supplying fuel to both of said engines while selectively transferring fuel from said third fuel reservoir into one of said first and second fuel reservoirs.

9. The method of claim 7, wherein using a second fuel balancing circuit comprises using a pair of operator selectable pumps in communication with said third fuel reservoir.

10. The method of claim 9, wherein using a first fuel balancing circuit comprises using a crossfeed flow control valve in flow communication with both of said engines to control fuel flow between said engines.

11. The method of claim 7, wherein using a second fuel balancing circuit comprises using an operator controlled switch to initiate an automatic fuel rebalancing operation between said first and second fuel reservoirs.

12. The method of claim 11, wherein initiating an automatic fuel rebalancing operation comprises controlling a plurality of valves associated with each of said first and second fuel reservoirs to achieve fuel flow between said first and second fuel reservoirs such that a quantity of fuel in each of said first and second fuel reservoirs is approximately equal.

13. The method of claim 12, wherein fuel continues to be supplied from the one of said fuel reservoirs having a lesser amount of fuel than the other one of said fuel reservoirs, while the fuel reservoir with the lesser amount of fuel receives from the higher fuel reservoir.

14. The method of claim 7, wherein using said first fuel balancing circuit comprises using said first fuel balancing circuit to balance fuel levels in said first and second fuel reservoirs while said engines are not operating.

15. A method for controlling a fuel system on a mobile platform having first, second and third independent fuel reservoirs, and a pair of engines, comprising:
   using a first fuel balancing circuit to selectively supply fuel directly to said engines from said first and second fuel reservoirs, and to selectively transfer fuel between said first and second fuel reservoirs to balance said first and second fuel reservoirs in weight; and
   using a second fuel balancing circuit to supply fuel from said third fuel reservoir to said pair of engines, and to selectively transfer fuel from said third fuel reservoir to either of first and second fuel reservoirs to balance fuel levels in said first and second fuel reservoirs; and
   using an operator control panel to selectively control which of said first and second fuel balancing circuits are used.

16. The method of claim 15, wherein using a first fuel balancing circuit comprises selectively transferring fuel between said first and second fuel reservoirs without interrupting a supply of fuel flow to either of said engines.

17. The method of claim 15, wherein using a first fuel balancing circuit comprises using said operator control panel to control a flow control valve and a plurality of pumps operably associated with said first and second fuel reservoirs to selectively transfer fuel between said fuel reservoirs while both of said engines are operating.

18. The method of claim 15, wherein using a first fuel balancing circuit comprises selectively transferring fuel between said first and second fuel reservoirs while said engines are not operating.

19. The method of claim 15, wherein using said a fuel balancing circuit comprises controlling a plurality of pumps associated with said third fuel reservoir, and valves associated with each of said first and second fuel reservoirs, to selectively transfer fuel from said third fuel reservoir to either of said first and second fuel reservoirs to balance fuel levels in said first and second fuel reservoirs.

20. The method of claim 15, wherein using an operator control panel further comprises enabling an operator to selectively control a plurality of pumps associated with said fuel reservoirs and to control at least one valve disposed in a fluid flow path between said engines.

* * * * *